United States Patent [19]
McGuth

[11] Patent Number: 4,621,953
[45] Date of Patent: Nov. 11, 1986

[54] ANTI-EROSION PROTRUSIONS FOR WEAR SURFACES IN FLUID CONDUITS

[75] Inventor: Joseph C. McGuth, Chatham, N.J.

[73] Assignee: Foster Wheeler Energy Corporation, Livingston, N.J.

[21] Appl. No.: 682,127

[22] Filed: Dec. 14, 1984

[51] Int. Cl.⁴ .............................................. B65G 53/52
[52] U.S. Cl. .................................... 406/193; 138/39; 285/179
[58] Field of Search ............... 406/191, 193; 285/179, 285/183; 138/39

[56] References Cited

U.S. PATENT DOCUMENTS

| | | | |
|---|---|---|---|
| 2,834,059 | 5/1958 | Hoelzel | 406/191 X |
| 3,924,901 | 12/1975 | Phillips | 406/193 X |
| 4,004,615 | 1/1977 | Stern et al. | 138/39 X |

FOREIGN PATENT DOCUMENTS 729880  5/1955  United Kingdom ............... 406/193

Primary Examiner—Jeffrey V. Nase
Attorney, Agent, or Firm—Marvin A. Naigur; John E. Wilson; Martin Smolowitz

[57] ABSTRACT

A fluid flow conduit having its interior wear surface containing multiple anti-erosion protrusions for reducing erosion caused by flow of fluids carrying abrasive particles. The anti-erosion protrusions are usually located on radial outer portion of an elbow, and are preferably pyramid-shaped and arranged in a staggered pattern relative to the fluid flow direction, but other similar shapes can be used. The protrusions can be made integral with the conduit interior wall, or attached to the wall by welding individual protrusions, or by welding to the wall curved plates each containing a row of protrusions. Such protrusions reduce erosion in conduits for particulate bearing fluid streams flowing at velocities over about 50 ft/sec, to disrupt the fluid flow pattern, reduce the velocity and change the angle of impingement of abrasive particles, in areas where high wear rates occur and substantially reduce the rate of wear on the conduit surface.

10 Claims, 8 Drawing Figures

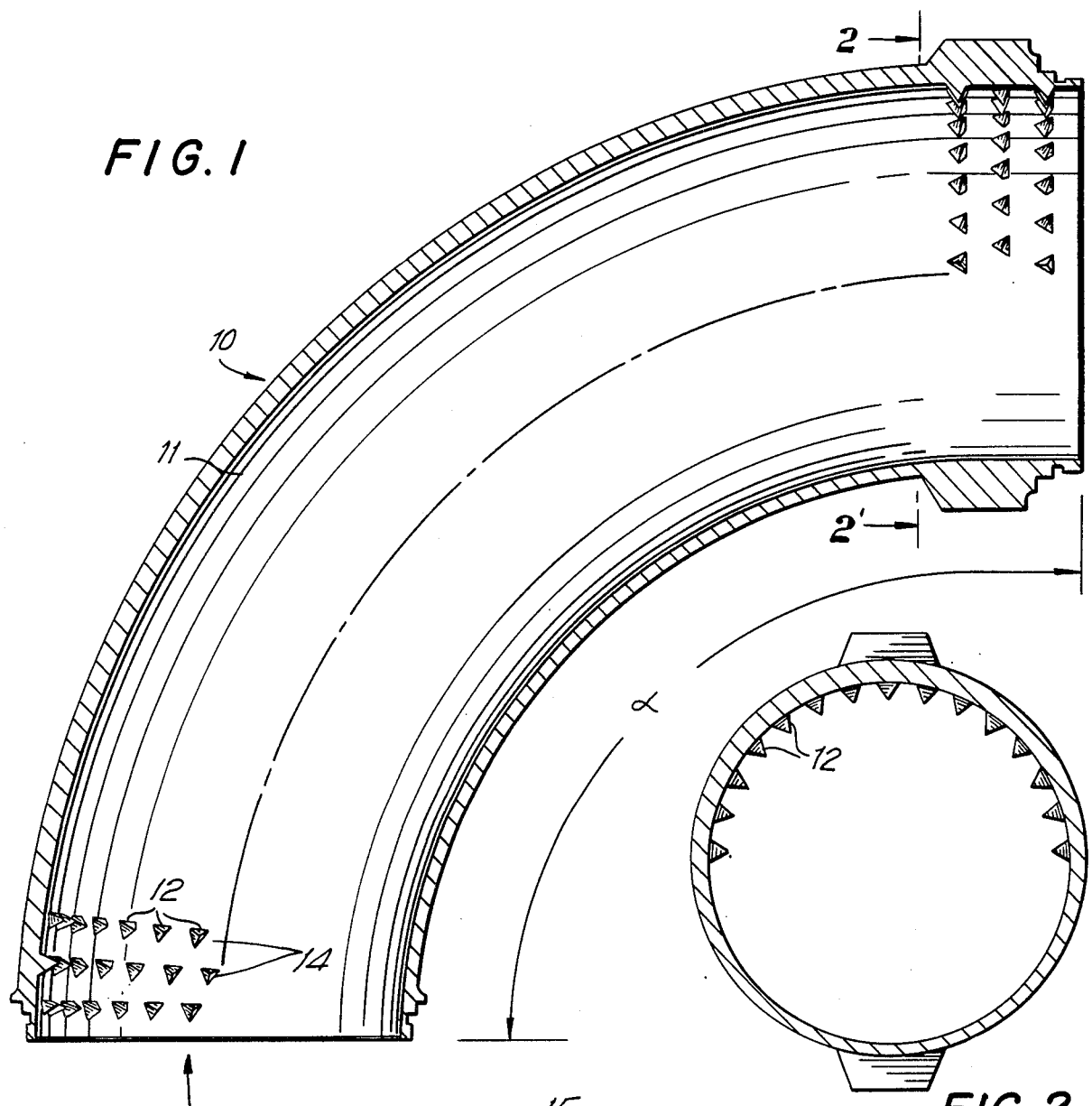
FIG. 1
FIG. 2
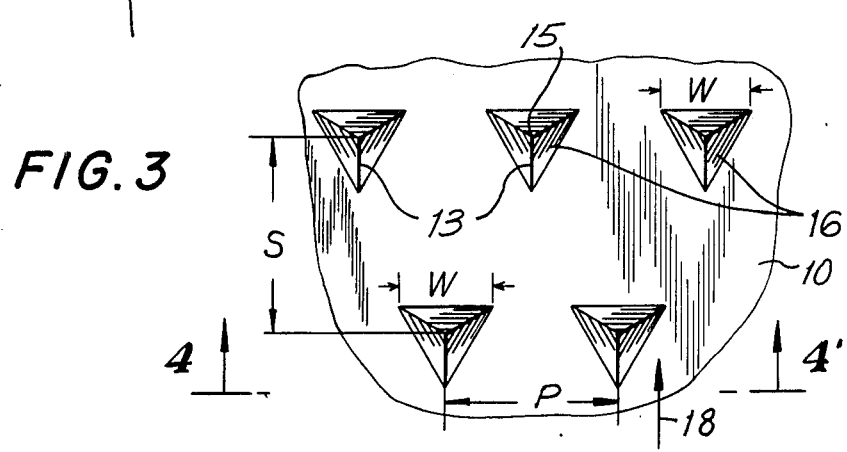
FIG. 3
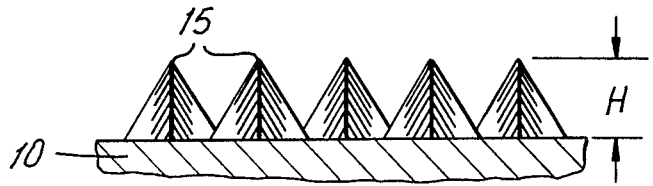
FIG. 4

U.S. Patent Nov. 11, 1986 Sheet 2 of 2 4,621,953
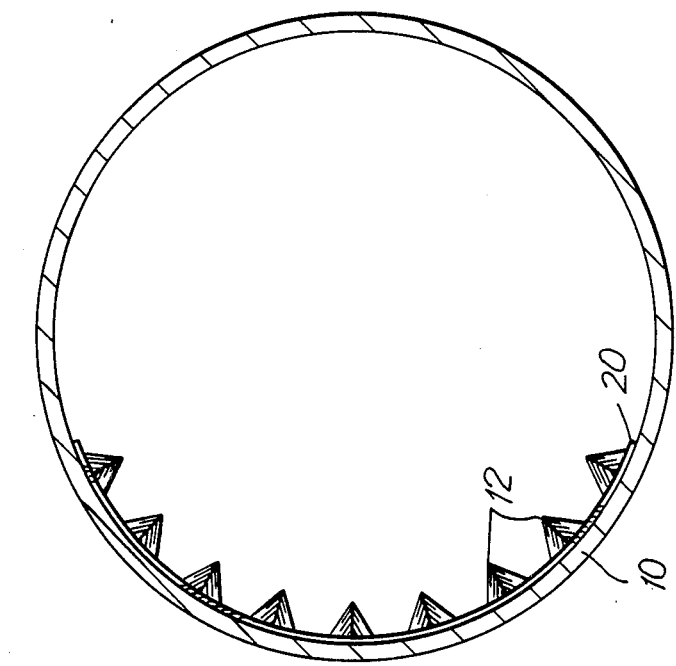
FIG.5
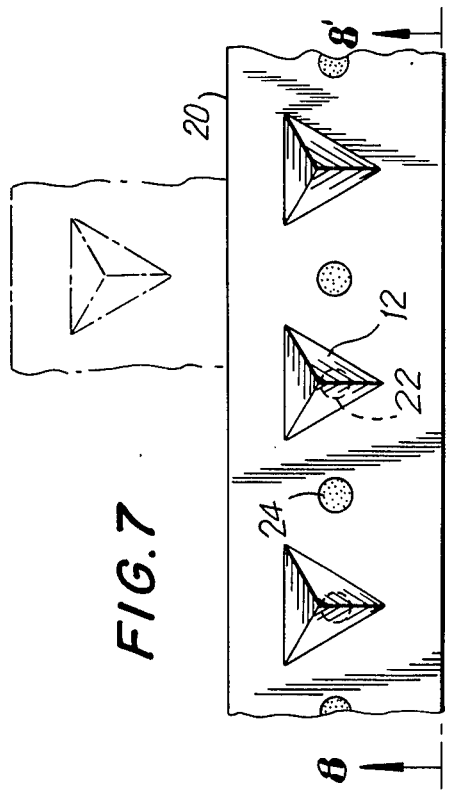
FIG.6
FIG.7
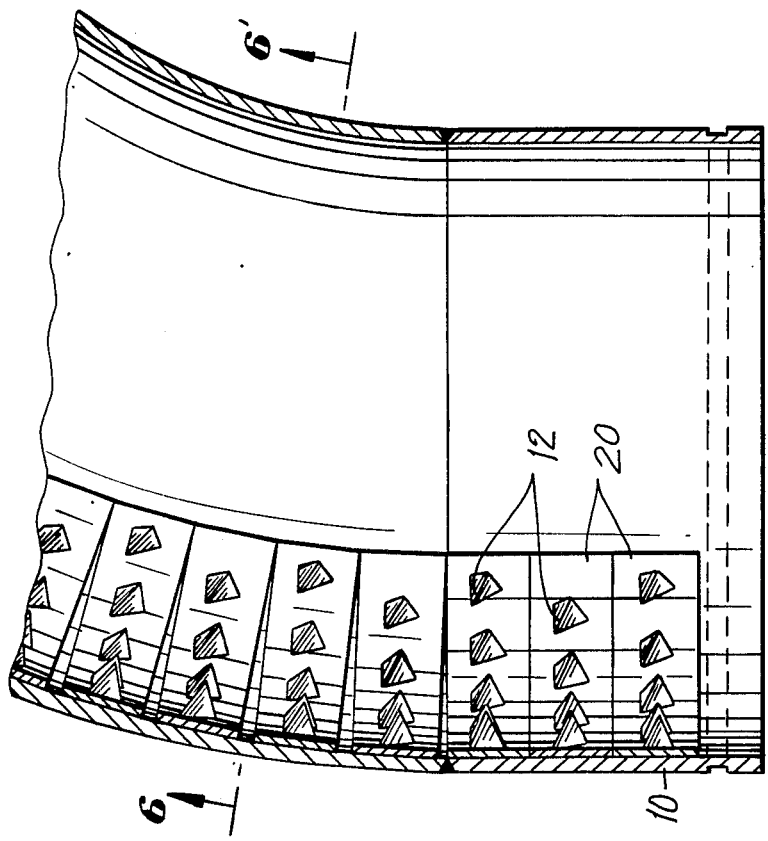
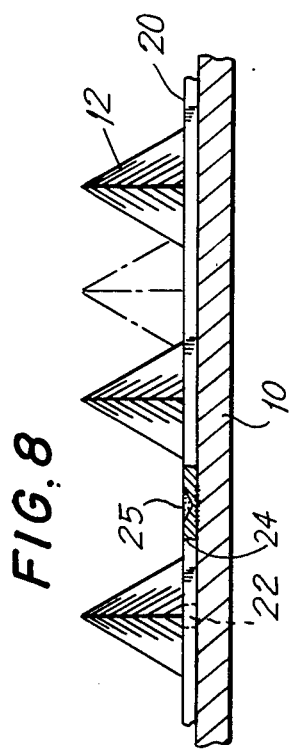
FIG.8

ANTI-EROSION PROTRUSIONS FOR WEAR SURFACES IN FLUID CONDUITS

BACKGROUND OF INVENTION

This invention pertains to anti-erosion protrusions provided on wear surfaces exposed to abrasive action and wear from an erosive flowing medium, such as within fluid-carrying conduits. It pertains particularly to such anti-erosion protrusions having specific shapes and patterns and attached to the radial outer portion of the interior surface of elbows to provide anti-erosion protection for the surface.

Protrusions have been used within conduits as a means for distributing fluid flow. For example, the distribution of the heavier particles of a coal-air mixture leaving a pulverizer exhauster vary with capacity, and protrusions have been used within conduits as a mechanical means to evenly distribute the coal flow to various conduits located downstream from the exhauster. However, at the time these protrusions were used, the flow velocities were low so that interior surface abrasion was not a problem.

The undesired erosion in fluid-carrying conduits handling abrasive particulate solids such as coal, sand, etc., has been combated by using various hard materials such as cast iron, ni-hard iron, stainless steel, and similar materials having a relatively high Brinell hardness number. Also, cladding the conduit interior surface with various ceramic or metallic patches which provide a coating of a hard abrasive-resistant material have been tried. One arrangement has been the use of abrasion-resistant ceramic materials, such as nitrite bonded silicon carbide, dense alumina, or fused cast alumina, bonded to the conduit inner surface. Although such uses of bonded ceramic materials are effective, the thickness requirements for the ceramic material and its bonding agent result in increased weight for the metal conduit and accompanying increased costs. Other disadvantages for such use of ceramics are the difference in thermal expansion coefficients between the ceramic material and the outside metal conduit or container, and the potential for their breakage from thermal shock during operations.

Some, limited use of protrusions in fluid conduits and pipes for specific purposes is generally known. For example, U.S. Pat. No. 1,518,705 to Raun discloses a pipe and elbow configuration having longitudinal corrugations cast integrally into the interior surface to provide a wearing surface for flowing particulate materials. U.S. Pat. No. 2,834,059 to Hoelzel discloses a pneumatic bulk transport system for handling bulk fibrous insulation material, and having a plurality of pins or teeth extending inwardly from the conduit wall in a staggered relationship to facilitate flow control and avoid accumulations of the fibrous material. Also, U.S. Pat. No. 3,924,901 to Phillips discloses a particle build-up suppressor having various shaped fin projections located on the inner surface of an elbow for particle deflection and separation purposes, however, no erosion prevention capability is disclosed. Thus, further improvements are needed in providing anti-erosion protection for the interior surfaces of fluid conduits, particularly for elbows handling abrasive and/or erosive materials such as airborne coal particles and hot flue gases carrying particulate ash solids. Such improvements in anti-erosion protection have been advantageously provided by this invention.

SUMMARY OF INVENTION

The present invention provides fluid conduits suitable for flow of fluids carrying abrasive particles, the conduit having an arrangement of protrusions on the interior wear surface of the conduit in a staggered pattern for anti-erosion protection of the surface, particularly for high superficial velocities exceeding about 60 ft/sec. The anti-erosion protrusions used on the inside of such fluid conduit or container are pyramid-shaped and are provided in rows, with the protrusions being staggered in the adjacent rows. These protrusions can be individually cast or otherwise attached to the interior surface of a flow conduit, or can be installed as rows on strips that are secured in the flow path. The anti-erosion protrusions are preferably attached to the radial outer portion of the interior surface of an elbow, or multiple protrusions can be provided on sheets which are welded to the radial outer portion of an elbow interior surface. The anti-erosion protrusions are made pyramid-shaped and preferably have at least three sides, although other similar configurations and shapes could be used. The protrusions have a hardness of at least about 100 Brinell hardness number, and preferably hardness of 120–250 Brinell number. These anti-erosion protrusions are particularly useful in conduits for carrying particulate-containing fluid streams flowing at superficial velocities exceeding about 60 ft/sec, and preferably at 80–150 ft/sec velocity.

During use, the protrusions according to this invention provide local obstructions to the flow which disrupt and deflect the abrasive particles in the flowing medium into the flow stream, thereby breaking up the mass of particles, reducing their velocity and changing their angle of impringement, all of which can contribute to erosion. A typical application is for the reduction of erosion in coal conduit bends from the particles of hard materials like silica, iron, slate, etc., contained in the coal-air stream. It is anticipated that balls, rectangles or other similar shapes made of relatively hard, abrasion-resistant materials such as cast iron and steel in various configurations will be effective for handling different abrasive flowing mediums. The effectiveness of the protrusions is enhanced by non-abrasive materials also being deflected and causing a disruption of the flow of the abrasive particles. In this way erosion of the conduit wall is minimized by the flow deflection action and sacrificial erosion of the protrusions. The protrusion configuration used will also allow some entrapment of the flowing medium particles, which will advantageously permit erosion by the flowing medium on the flowing medium.

It is an advantage of the present invention that the flow of fluids carrying abrasive particulates through a conduit is disturbed by the protrusions provided in a uniform staggered pattern to provide turbulence, so that most of the abrasive particles do not impinge against the conduit interior surface to erode the conduit, and erosion of the interior surface of the conduit is substantially prevented.

BRIEF DESCRIPTION OF DRAWINGS

This invention will be described by reference to the following drawings, in which:

FIG. 1 shows a general longitudinal sectional view of a conduit elbow for carrying a fluid containing abrasive particles and having protrusions attached to the radial outer portion of its interior surface.

FIG. 2 shows a cross-sectional view taken at line 2—2' of FIG. 1.

FIG. 3 is a detail plan view showing a typical staggered location of triangular-shaped protrusions relative to each other.

FIG. 4 shows an elevation view of the protrusions taken at line 4—4' of FIG. 3.

FIG. 5 shows a partial longitudinal sectional view of an elbow showing one useful means for attaching strips of multiple protrusions to the radial outer portion of the interior surface of the elbow.

FIG. 6 shows a cross-sectional view taken at line 6—6' of FIG. 5.

FIGS. 7 and 8 are plan and elevational views, respectively, showing an alternative means for attaching multiple protrusions onto a conduit interior wall.

DESCRIPTION OF INVENTION

One useful embodiment of the present invention is generally shown by FIG. 1, which shows a longitudinal sectional view of a fluid conduit elbow 10 adapted for carrying an abrasive fluid, such as air-borne coal or ash particles for power plant applications. The elbow 10 has a plurality of protrusions 12 attached uniformly to the radial outer curved portion 11 of the interior surface of the elbow. The elbow 10 usually has an included angle α of at least about 30 degrees and not exceeding 90 degrees. The protrusions 12 are preferably provided in rows 14 for increased ease of construction or installation. The location for the protrusions 12 on the outer radial portion 11 of the elbow 10 is shown more clearly in the FIG. 2 cross-sectional drawing.

As shown in greater detail in FIG. 3, the protrusions 12 are generally made pyramid-shaped and oriented to have a leading edge 13 and an apex 15, and having at least three angled surfaces 16, but the protrusions can have other similar shapes as well. In the adjacent rows 14, the protrusions 12 are provided in a uniform staggered pattern so as to produce increased flow turbulence and effectively break up the fluid flow pattern adjacent the outer radial portion 11 of the conduit 10, and thereby prevent the abrasive particles from scrubbing against the elbow outer wall and causing undesired erosion of the conduit. The protrusions 12 are preferably in the shape of triangular equilateral pyramids with the leading edge 13 oriented towards the fluid flow direction as indicated by arrow 18, but they can be oriented at various angles to the fluid flow direction so as to produce flow turbulence and effectively break up the flow pattern and prevent erosion of the conduit inner surface. With such disrupted flow, the abrasive particles lose velocity and become less abrasive, thereby reducing erosion on the downstream protrusion obstructions to the flow. The height or thickness of the protrusions will allow the erosion to occur on the obstructions and absorb erosive forces and energy in an area which will maintain the continued pressure retaining capability and extended use of the conduit.

The protrusion sides can be made flat or curved. Also, the height, base width and pitch of the protrusions will vary with the diameter of the conduit elbow, the fluid and abrasive media flowing in the conduit, and the superficial velocity of the fluid. It has been found that a useful location pattern for the protrusions 12 is to have the pitch p between the individual protrusions 2-5 times the base width w of the protrusion, with the protrusions in adjacent rows having spacing s being provided in a staggered pattern, as is shown in FIGS. 3 and 4. The pitch p of the protrusions 12 is preferably reduced for elbows having a smaller radius of curvature. Also, the height H of the protrusions 12 as shown in FIG. 4 should be between about 0.5 and 1.5 times the average base width W, with a height H to width w ratio of about 0.7-1.3 usually being preferred.

The protrusions 12 integrally cast onto surface 11 of conduit 10 as generally shown in FIGS. 3 and 4. Alternatively, the protrusions can be conveniently and advantageously attached to the interior wall portion 11 of conduit 10 by first providing a plurality of the protrusions brazed or welded onto a metal strip 20 by utilizing spaced openings 22 in the strip. The multiple metal strips 20 are then arranged in adjacent substantially parallel rows and brazed or welded onto the inner surface portion 11 of the conduit 10 utilizing spaced openings 24, as is generally shown in FIG. 5. The metal strip 20 having openings 24 can be plug welded at 25 onto the interior surfaces 11 of the conduit 10, as is better shown in FIGS. 7 and 8.

The surface hardness for the protrusions is at least equal to that of the conduit wall surface 11, and should be at least about 100 Brinell hardness number and is usually 120-250 Brinell number. Materials most suitable for the conduit and protrusions are cast irons and steel. The present invention is most useful for curved conduits or elbows having diameters of 12-20 inches, and for which the radius of curvature will usually be about 1.5-2.5 times the elbow diameters. The elbow 10 will usually have an included angle α between about 30° and 90°.

The invention will be better understood by reference to the following Examples of fluid conduit constructions containing the anti-erosion protrusions in accordance with the invention.

EXAMPLE 1

An elbow having 20 inch nominal diameter and 90° included angle and having 40 inch radius of curvature is cast from iron having ASTM-A48 material specification, with the radial outer wall thickness 1.25 inch and the radial inner wall thickness 0.750 inch. Pyramid-shaped protrusions having three flat equilateral sides are uniformly cast into the radial outer half of the elbow interior wall, similarly as shown in FIGS. 1–4. The pyramid protrusions have equilateral sides of 1.25 inch width and 1.02 inch height and are located 2.25 inches apart and staggered in the adjacent rows, which are spaced 2.375 inches apart at the outer circumference of the elbow. Such a construction having the protrusions uniformly cast integrally into the elbow interior surface provides an elbow having substantially improved anti-erosion protection for use in service handling air-borne coal particles.

EXAMPLE 2

An elbow having 18 inch outside diameter and 90° included angle with 27 inch radius of curvature is fabricated from low alloy steel. Triangular-shaped equilateral pyramids having 1.25 inch side dimension are located 2.25 inch apart and plug welded onto steel strips 2.5 inches wide. The steel strips each containing a row of the spaced-apart pyramids are then plug welded onto the outer half of the elbow interior wall, similarly as shown in FIGS. 5–8. Such construction having the individual cast protrusions attached by welding provides an all fabricated construction useful for applications handling abrasive particles.

Although the invention has been described broadly and in terms of a preferred embodiment, it will be understood that modifications and variations can be made to the invention which is defined by the following claims.

I claim:

1. A conduit for flow of fluids containing abrasive solids, said conduit being a curved elbow and containing a plurality of protrusions attached to a radial outer portion of the elbow interior surface, said protrusions being pyramid-shaped having at least three sides and arranged in a staggered pattern with a leading edge oriented towards the fluid flow direction, whereby the protrusion sides can deflect a flowing fluid to each side, so as to produce turbulent flow of the solids-containing fluid and thereby provide anti-erosion protection for the conduit interior surface.

2. A fluid flow conduit according to claim 1, wherein said protrusions are pyramids each having three flat sides.

3. A fluid flow conduit according to claim 1, wherein said protrusions are uniformly spaced and have a center spacing between adjacent protrusions 2-5 times the average base width of the protrusions.

4. A fluid flow conduit according to claim 1, wherein said protrusions have a height to width ratio of 0.7:1–1.3:1.

5. A fluid flow conduit according to claim 1, wherein said protrusions are made integral with said conduit interior surface.

6. A fluid flow conduit according to claim 1, wherein said protrusions are individually attached to the conduit interior surface by welding.

7. A fluid flow conduit according to claim 1, wherein a plurality of protrusions are provided attached onto a metal plate, and a plurality of said metal plates are attached to the interior surface of the conduit.

8. A fluid flow conduit according to claim 1, wherein said protrusions have hardness of at least about 100 Brinell number.

9. A fluid flow conduit according to claim 1, wherein said curved elbow has an included angle of 30°–90°.

10. A conduit for flow of fluids containing abrasive solids, said conduit being a curved elbow having a radial outer portion of its interior surface containing a plurality of protrusions attached to the radial outer portion of the elbow interior surface, said protrusions being pyramid-shaped and having at least three sides and provided with a leading edge oriented toward the fluid flow direction, said protrusions being provided on metal plates in a uniform staggered pattern, which plates being attached to said elbow interior surface in an adjacent parallel row pattern, whereby the protrusion sides can deflect a flowing fluid to each side so as to produce turbulent flow of the solids containing fluid and thereby provide anti-erosion protection for the conduit interior surface.

* * * * *